United States Patent [19]

Ueno

[11] 3,939,117

[45] Feb. 17, 1976

[54] PROCESS FOR PRODUCING A POLYARYLENE ESTER

[75] Inventor: Katsuji Ueno, Hirakata, Japan

[73] Assignee: Sumitomo Chemical Company, Limited, Japan

[22] Filed: May 31, 1974

[21] Appl. No.: 475,181

[30] Foreign Application Priority Data

May 31, 1973 Japan............................... 48-61533

[52] U.S. Cl............................ 260/47 C; 260/338 R
[51] Int. Cl.²......................................... C08G 63/40
[58] Field of Search................................ 260/47 C

[56] References Cited
UNITED STATES PATENTS

| | | | |
|---|---|---|---|
| 2,035,578 | 3/1936 | Wagner..................................... | 260/2 |
| 3,067,169 | 12/1962 | Krimm et al........................ | 260/46.5 |
| 3,216,970 | 11/1965 | Conix..................................... | 260/47 |
| 3,351,611 | 11/1967 | Conix..................................... | 260/47 |
| 3,786,022 | 1/1974 | Hata et al........................... | 260/47 C |

*Primary Examiner*—Lester L. Lee
*Attorney, Agent, or Firm*—Stewart and Kolasch, Ltd.

[57] ABSTRACT

A process for producing a polyarylene ester, which comprises subjecting to a polymerization reaction a slurry of at least one divalent phenol, at least one aromatic carboxyl dichloride and calcium hydroxide (in the form of solid particles), the calcium hydroxide being used in an amount of at least 1.5 mol to one mol of the divalent phenol, in an inert organic liquid which is a solvent for the polyarylene ester but not a solvent for calcium hydro-oxide to give a reaction mixture consisting of a solid phase and a single liquid phase containing the polyarylene ester dissolved in the inert organic liquid, and then separating the liquid phase from the solid phase.

13 Claims, No Drawings

PROCESS FOR PRODUCING A POLYARYLENE ESTER

The present invention relates to a process for producing a linear polyarylene ester, and more particularly to a novel and economical process for producing a polymerization reaction mixture, from which a pure polyarylene ester can be effectively recovered.

Polyarylene esters have, hitherto, been produced by reacting a divalent phenol or its salt and an aromatic carboxyl dichloride by two methods, i.e. solution condensation polymerization and interfacial condensation polymerization. Briefly, the solution condensation polymerization method comprises reacting a divalent phenol and an aromatic carboxyl dichloride in the presence of a base and a solvent, and the interfacial condensation polymerization method comprises mixing an aqueous solution of a divalent phenol, an inorganic base and a solvent to give an emulsion and therewith reacting a solution of an aromatic carboxyl dichloride.

According to the known methods, the desired polyarylene esters can be produced effectively, but the treatment of the reaction mixture is very troublesome.

For instance, according to the solution condensation polymerization method for producing a high molecular weight polyarylene ester, it is necessary to use an expensive organic base as an acid acceptor in the polymerization reaction and further troublesome problems are encountered in the purification of the polymer and in the separation and recovery of the solvent. That is, the organic solvent used such as pyridine or triethylamine is hardly recovered from the reaction mixture and therefore it requires a very expensive separation apparatus. Besides, the polymer-containing solution must be washed with a large amount of water for removing completely pyridine hydrochloride or triethylamine hydrochloride therefrom.

On the other hand, according to the interfacial condensation polymerization method, the reaction mixture comprises an organic phase consisting of a solution of the polyarylene ester in a solvent and an aqueous phase, and the solution of polymer contains waste materials in high concentration which must be removed by washing well with water. In such washing step the mixture is emulsified and therefore both phases are hardly separated from each other, and moreover, a large amount of water is required therefor. Thus, the interfacial condensation polymerization method has a defect in the treatment of the waste water, particularly in case of producing the polyarylene ester in a large scale.

The present inventors have extensively studied to find an improved process for producing a polyarylene ester, particularly the improvement in the treatment of the reaction mixture, and as a result have now found a novel and economical process for producing a polymerization reaction mixture, from which a pure polyarylene ester can be effectively recovered.

An object of the present invention is to provide an improved process for producing a polyarylene ester.

Another object of the invention is to provide a process for producing a polymerization reaction mixture, from which the desired polyarylene ester can be effectively recovered.

These and other objects will be apparent from the description hereinafter.

According to the present invention, the desired polyarylene ester can be produced by subjecting to a polymerization reaction a slurry of at least one divalent phenol, at least one aromatic carboxyl dichloride and calcium hydroxide (in the form of solid particles) in an inert organic liquid which is a solvent for the polyarylene ester but not a solvent for calcium hydrooxide to give a reaction mixture consisting of a solid phase and a single liquid phase containing the polyarylene ester dissolved in the inert organic liquid, and then separating the liquid phase from the solid phase.

The divalent phenol used in the present invention includes hydroquinone, resorcinol, 2,2-bis(4-hydroxyphenyl)propane, 2,2-bis(4-hydroxy-3,5-dichlorophenyl)propane, 2,2-bis(4-hydroxy3,5-dibromophenyl)propane, 2,2-bis(4-hydroxyphenyl)cyclohexane, 4,4'-dihydroxydiphenyl, or the like. Other examples of the divalent phenol are described in Japanese Patent Publication No. 9446/1963. If desired, two or more kinds of the divalent phenol may be used together.

The representative examples of the aromatic carboxyl dichloride used in the present invention may be isophthaloyl chloride, terephthaloyl chloride, or a mixture thereof. Other examples thereof are described in Japanese Patent Publication No. 9446/1963.

When a copolymer is desired instead of a homopolymer, two or more different kinds of the divalent phenol may be used in the polymerization reaction. A polymerization catalyst may be used in the reaction. suitable examples of the catalyst are a tertiary amine (e.g. triethylamine, tripropylamine or N,N-dimethylaniline), a quaternary ammonium compound (e.g. tetraethylammonium bromide, cetyltriethylammonium bromide, tetra-n-propylammonium bromide, tetramethylammonium hydroxide, tetra-n-butylammonium iodide or benzyltrimethylammonium chloride), a quaternary phosphonium compound (e.g. n-butyltriphenylphosphonium bromide or methyltriphenylphosphonium bromide), or the like. The catalyst may be used in a range of 0.001 to about 5 % by mol on the basis of the divalent phenol which is originally added to the slurry.

A molecular weight modifier may be also added to the polymerization reaction. The suitable molecular weight modifier may be a monofunctional phenol (e.g. phenol or p-tert-butylphenol), a monofunctional alcohol (e.g. methanol or butanol), or the like. The molecular weight modifier may be used in an amount of 6 or less % by weight on the basis of the divalent phenol which is originally added to the slurry.

The inert organic liquid which is effective as a solvent for the polyarylene ester but not effective as a solvent for calcium hydroxide includes methylene chloride, 1,2-dichloroethane, chloroform, trichloroethane, tetrachloroethane, chlorobenzene, orthodichlorobenzene, or the like. The amount of the inert organic liquid is not critical, but it may usually be used in an amount sufficient to give a 3 to 25 % by weight solution of the polymer in the inert organic liquid. When the obtained reaction mixture is so viscous that the solution of polymer can not be separated from the solid inorganic phase, the inert organic liquid may be additionally added to the reaction mixture for effectively conducting the separation.

Calcium hydroxide is used in an amount of at least 1.5 mol to one mol of the divalent phenol. For instance, the amount of calcium hydroxide may vary within a range of about 1.5 to 8 mol to one mol of the divalent phenol which is originally added to the slurry, depending on the purity of the calcium hydroxide, the degree of polymerization and polymerization catalyst (if any).

Calcium hydroxide may be used together with a hydroxide, carbonate, bicarbonate, phosphate or phosphite of an alkali metal or alkaline earth metal (e.g. sodium hydroxide, potassium hydrooxide, magnesium hydroxide, sodium carbonate, potassium carbonate, magnesium carbonate, calcium carbonate, sodium bicarbonate, potassium bicarbonate, magnesium bicarbonate, calcium bicarbonate, sodium phosphate, potassium phosphate, magnesium phosphate, calcium phosphate, sodium hypophosphite, potassium hypophosphite, magnesium hypophosphite or calcium hypophosphite).

The reaction time may vary depending on the desired polymer, the degree of polymerization and other reaction conditions, but may usually be in a range of several to tens of minutes or several hours. The reaction temperature may also vary within a wide range, but may usually be in a range of 0° to 100°C. When methylene chloride is used as the inert organic liquid, the reflux temperature thereof is most preferable.

After the completion of the polymerization reaction, the single liquid phase containing the polyarylene ester is separated from the solid phase by a conventional liquid-solid separation method, e.g. filtration, centrifuging and decantation. Optionally, the filter cake obtained after the filtration or decantation may be repeatedly washed with an inert organic liquid which is the same as used in the polymerization reaction, and thereby the remaining polyarylene ester may be taken out.

The desired polyarylene ester may be separated from the solution thereof in the solvent by various methods, for instance, by precipitating the polymer by adding an aliphatic hydrocarbon (e.g. pentane, hexane or heptane) to the solution, the aliphatic hydrocarbon having a boiling point largely different from that of the solvent for the polymer, being able to be easily separated by distillation and being not used as a solvent for the polymer; by precipitating the polymer by adding methanol, acetone or the like to the solution; or by evaporating to dryness.

The present invention is illustrated by the following examples, but is not limited thereto.

EXAMPLE 1

To a 500 ml separable flask are added 2,2-bis(4-hydroxyphenyl)propane (22.8 g), calcium hydroxide (20.38 g), methylene chloride (150 ml) and triethylamine (0.05 ml). To the mixture is added dropwise a solution of terephthaloyl chloride (10.15 g) and isophthaloyl chloride (10.15 g) in methylene chloride (50 ml) at around 20°C over a period of 25 minutes with agitation under nitrogen gas. The mixture is agitated for 3 hours and thereafter allowed to stand for 15 hours. After separating the solid phase by a centrifuge, the methylene chloride solution is added to acetone. The resulting precipitate of the desired polymer is separated and dried. The polymer thus obtained has an inherent viscosity: $\eta sp/C = 0.780$, which is measured at 25°C in chloroform (C = 0.5 g/100 ml). (Hereinafter, it is measured under the same conditions as above unless mentioned otherwise).

EXAMPLE 2

To a 300 ml four-necked flask are added 2,2-bis(4-hydroxyphenyl)propane (11.4 g), calcium hydroxide (8.15 g), triethylamine (0.025 ml) and methylene chloride (100 ml). The mixture is heated to 30°C and then agitated for a while. After cooling to 10°C, to the mixture is added dropwise a solution of terephthaloyl chloride (5.075 g) and isophthaloyl chloride (5.075 g) in methylene chloride (40 ml) over a period of 20 minutes. The mixture is heated to 30°C and agitated for 10 hours and then allowed to stand. The reaction mixture is diluted with methylene chloride (200 ml) and agitated well. The supernatant fluid is taken out. The product has an inherent viscosity: $\eta sp/C = 2.48$.

EXAMPLE 3

To a 300 ml four-necked flask are added 2,2-bis(4-hydroxyphenyl)propane (22.8 g), calcium hydroxide (17.78 g), terephthaloyl chloride (10.15 g), isophthaloyl chloride (10.15 g), phenol (0.282 g) and methylene chloride (200 ml). The mixture is agitated well at room temperature for 30 minutes. To the mixture is added triethylamine (70 μl) and the mixture is subjected to a polymerization reaction with refluxing methylene chloride. After 8 hours, the reaction mixture is cooled to room temperature, diluted with methylene chloride (200 ml) and then filtered with a filter paper. To the filtrate is added acetone and the resulting precipitates are separated and dried to give the desired polymer having an inherent viscosity: $\eta sp/C = 0.500$.

EXAMPLE 4

The Example 3 is repeated except that the molecular weight modifier (phenol) is replaced by β-naphthol (0.290 g), o-phenylphenol (0.340 g), p-phenylphenol (0.425 g) or t-butylphenol (0.451 g) to give the desired polymer having an inherent viscosity: $\eta sp/C = 0.590$, 0.765, 0.790 or 0.647, respectively.

EXAMPLE 5

To a 300 ml four-necked flask are added 2,2-bis(4-hydroxyphenyl)propane (22.8 g), calcium hydroxide (17.78 g), o-phenylphenol (0.4255 g) and methylene chloride (150 ml). The mixture is agitated at room temperature for 30 minutes, and thereto is added triethylamine (70 μl) and further added dropwise a solution of terephthaloyl chloride (10.15 g) and isophthaloyl chloride (10.15 g) in methylene chloride (50 ml) over a period of 10 minutes. The mixture is subjected to a polymerization reaction with refluxing methylene chloride for 4 hours. The reaction mixture is filtered with a filter paper and the filtrate is condensed to give gelling materials. The materials are pulverized and then dried to give the desired polymer having an inherent viscosity: $\eta sp/C = 0.834$.

EXAMPLE 6

The Example 5 is repeated except that the catalyst (triethylamine) is replaced by tetraethylammonium bromide (0.105 g) or pyridine (41 μl) to give the desired polymer having an inherent viscosity: $\eta sp/C = 0.780$ or 0.530, respectively.

EXAMPLE 7

To a 300 ml four-necked flask are added 2,2-bis(4-hydroxyphenyl)propane (22.8 g), calcium hydroxide (17.78 g), o-phenylphenol (0.2553 g) and sym-tetrachloroethane (150 ml). The mixture is agitated at room temperature for 30 minutes, and thereto is added triethylamine (70 μl) and further added dropwise a solution of terephthaloyl chloride (20.3 g) in tetrachloroethane (50 ml) over a period of 10 minutes. The mixture is subjected to a polymerization reaction at 50°–65°C for 2 hours. The reaction mixture is filtered with a filter paper and the filtrate is further filtered with a filter having 0.1 μ in thickness under reduced pressure. A film is formed from the filtrate by a casting method. The film thus obtained has an inherent viscosity: $\eta sp/C = 0.856$ (in phenol-tetrachloroethane, at 50°C, and C = 0.5 g/100 ml).

EXAMPLE 8

The Example 5 is repeated except that 2,2-bis(4-hydroxyphenyl)propane (22.8 g) is replaced by 2,2-bis(4-hydroxyphenyl)propane (19.88 g) and 2,2-bis(4-hydroxy-3,5-dibromophenyl)-propane (8.16 g) to give the desired polymer having an inherent viscosity: $\eta sp/C = 1.120$.

EXAMPLE 9

To a 1,000 ml separable flask are added 2,2-bis(4-hydroxyphenyl)propane (68.4 g), calcium hydroxide (33.35 g), phenol (0.79 g) and methylene chloride (500 ml), and the mixture is agitated at 20°C for 30 minutes. To the mixture is added triethylamine (0.42 ml) and further added dropwise a solution of terephthaloyl chloride (30.45 g) and isophthaloyl chloride (30.45 g) in methylene chloride (200 ml) at the reflux temperature of methylene chloride, in which the reflux of methylene chloride occurs by the heat of reaction. After heating for 5 hours at the reflux temperature, the reaction mixture is filtered to give a solution of polymer. The solution of polymer is washed with diluted hydrochloric acid and further washed well with water, and then stripped with steam to give the desired polymer in a solid state, which has an inherent viscosity: $\eta sp/C = 0.470$.

EXAMPLE 10

Example 9 is repeated except that the amount of calcium hydroxide is 44.46 g and sodium hypophosphite (0.3 g) is additionally used to give the desired polymer having an inherent viscosity: $\eta sp/C = 0.650$.

What is claimed is:

1. A process for producing a polyarylene ester, which comprises subjecting to a polymerization reaction at a temperature of 0° to 100° C, in the presence of a polymerization catalyst selected from the group consisting of a tertiary amine, a quaternary ammonium compound and a quaternary phosphonium compound, a slurry of at least one divalent phenol, at least one aromatic carboxyl dichloride, and calcium hydroxide in the form of solid particles, said polymerization catalyst being used in an amount of 0.001 to about 5 molar % based on the amount of the divalent phenol and said calcium hydroxide being present in an amount of at least 1.5 mol per one mol of said divalent phenol, in an inert organic liquid which is a solvent for the polyarylene ester but not a solvent for the calcium hydroxide to give a reaction mixture consisting of a solid phase and a single liquid phase containing the polyarylene ester dissolved in the inert organic liquid, and then separating the liquid phase from the solid phase.

2. The process according to calim 1, wherein the divalent phenol is a member selected from the group consisting of hydroquinone, resorcinol, 2,2-bis(4-hydroxyphenyl)propane, 2,2-bis(4-hydroxy-3,5-dichlorophenyl)propane, 2,2-bis(4-hydroxy-3,5-dibromophenyl)propane, 2,2-bis(4-hydroxyphenyl)cyclohexane and 4,4'-dihydroxydiphenyl.

3. The process according to claim 1, wherein the aromatic carboxyl dichloride is a member selected from the group consisting of isophthaloyl chloride and terephthaloyl chloride.

4. The process according to claim 1, wherein the inert organic liquid is a member selected from the group consisting of methylene chloride, 1,2-dichloroethane, chloroform, trichloroethane, tetrachloroethane, chlorobenzene and orthodichlorobenzene.

5. The process according to claim 1, wherein the polymerization reaction is carried out in the presence of a molecular weight modifier.

6. The process according to claim 5, wherein the molecular weight modifier is a member selected from the group consisting of a monofunctional phenol and a monofunctional alcohol.

7. The process according to claim 6, wherein the molecular weight modifier is used in an amount of 6 or less % by weight on the basis of the divalent phenol.

8. The process according to claim 1, wherein the calcium hydroxide is used together with a hydroxide, carbonate, bicarbonate, phosphate or phosphite of an alkali metal or alkaline earth metal.

9. The process according to claim 1, wherein the quaternary ammonium compound is a member selected from the group consisting of tetraethylammonium bromide, cetyltriethylammonium bromide, tetra-n-propylammonium bromide, tetramethylammonium hydroxide, tetra-n-butylammonium iodide and benzyltrimethylammonium chloride.

10. The process according to claim 1, wherein the quaternary phosphonium compound is a member selected from the group consisting of n-butyltriphenylphosphonium bromide and methyltriphenylphosphonium bromide.

11. The process according to claim 1, wherein the tertrary amine is a member selected from the group consisting of triethylamine, tripropylamine and N,N-dimethylaniline.

12. The process according to claim 6, wherein the monofunctional phenol is a member selected from the group consisting of phenol, p-tert-butylphenol, β-naphthol, o-phenylphenol and p-phenylphenol.

13. The process according to claim 6, wherein the monofunctional alcohol is a member selected from the group consisting of methanol and butanol.

* * * * *